United States Patent [19]
Matsuoka et al.

[11] Patent Number: 5,654,069
[45] Date of Patent: Aug. 5, 1997

[54] CUSHION BODY STRUCTURE FOR NOISE PREVENTION

[76] Inventors: Chikara Matsuoka, 33-15, Wada 3-chome, Tamano City, Okayama Prefecture 706; Takeshi Watadani, 564-A302, Kojima-Hiedacho, Kurashiki City, Okayama Prefecture 711; Kunihisa Wakimoto, 919-4, Kawairi, Okayama City, Okayama Prefecture 701-01; Yukihiro Kinoshita, 4021-1, Tamashima-Michiguchi, Kurashiki City, Okayama Prefecture 713, all of Japan

[21] Appl. No.: 446,585
[22] PCT Filed: Apr. 25, 1994
[86] PCT No.: PCT/JP94/00683
§ 371 Date: Jun. 9, 1995
§ 102(e) Date: Jun. 9, 1995
[87] PCT Pub. No.: WO95/08506
PCT Pub. Date: Mar. 30, 1995

[30] Foreign Application Priority Data

Sep. 19, 1993 [JP] Japan .................................. 5-254798

[51] Int. Cl.$^6$ .................................................... A47C 31/02
[52] U.S. Cl. .................. 428/99; 428/100; 428/188; 297/228.13; 297/452.26
[58] Field of Search .................. 428/100, 99, 188; 297/452.26, 228.13

[56] References Cited

FOREIGN PATENT DOCUMENTS

| 2423666 | 11/1979 | France . |
| 3903847A1 | 8/1990 | Germany . |
| 122494 | 5/1988 | Japan . |

OTHER PUBLICATIONS

Supplementary European Search Report (conducted in relation to corresponding EPO Application), Jun. 13, 1996.

*Primary Examiner*—Alexander Thomas
*Attorney, Agent, or Firm*—Renner, Kenner, Greive, Bobak, Taylor & Weber

[57] ABSTRACT

A cushion body structure (1) is connected to a planar fastening body (4) with a cushion material (6), by spacing in a proper distance at least a part along a side end (7) of the planar fastener (4) from the cushion material (2, 3) positioned in proximity of it through a space (11). When a skin material (12) fastened to the planar fastener (4) is tensioned, it is not moved to separate from and fasten to the skin material again and thereby does not produce noise.

3 Claims, 2 Drawing Sheets

CUSHION BODY STRUCTURE FOR NOISE PREVENTION

TECHNICAL FIELD

The present invention relates to a cushion body structure for a car seat and, in particular, relates to a cushion body structure available for preventing noise produced by a repetition of separating and fastening between a skin and a planar fastening material by the manner of attaching the skin material to a cushion material through the planar fastening material.

BACKGROUND OF THE ART

Several methods for attaching a cushion material which is made of a foamed body forming a body portion of a car seat and a skin material attached on its surface have been known and publicly used. Specifically as a method of attaching a skin material to a cushion material with a concave surface, a back surface of the skin was bonded over a surface of the cushion material or an integral molding method of injecting urethane into a cushion material molding die after setting a skin material have often been used. However, in either method, their own production systems for carrying out such methods are required and it is difficult to install such systems in a continuous assembly line, thereby increasing the cost for transferring and manipulating materials. Also, such a method in the art is a mass production system and it is thus required to maintain its operation rate. However it is difficult to control a volume corresponding to a variation of the production rate. Thus, such a production method results in low productivity and causes a rise in cost.

It is intended to use a planar fastening material in order to facilitate attaching a skin material to a cushion material to eliminate the above problems. The planar fastening material is so called a planar fastener and has innumerable hooked or ring-shaped small protrusions imbedded on a knitted or textile base sheet. The hooked or ring-shaped small protrusions fasten and mechanically attach to a back side of the skin material. However, in this mechanical attachment of the skin by the planar fastening material, unexpected troubles are found in practice.

Explaining the troubles with reference to FIG. 4, when a person gets off a seat 15, a tensile force as indicated by an arrow F1 acts on a skin 16. Since the skin 16 is attached on the planar fastening material 17 by the mechanical tensile force, the skin is instantaneously separated from the planar fastening material, when a component F2 of the tensile force F1 exceeds the mechanical attachment force. However, if the force F1 is reduced by movement of the person, then the skin is immediately fastened to the planar fastening material to revert to its initial state again. Such a repetition of separating and fastening produces noise or vibration, and users may have distrust of the quality of the seat and they may also feel displeasure and wariness. Also, they may mistake the noise for static electricity.

OBJECTS

Therefore, it is an object of the present invention to provide a cushion body structure for a car seat which prevents a repetition of separating and fastening between a planar fastening material and a skin material and prevents the resultant production of noise or vibration in a seat in which the skin material is attached to the cushion material by the planar fastening material.

DISCLOSURE OF THE INVENTION

In a cushion body structure of a car seat constructed by molding a planar fastening body for fastening a skin material to a cushion material, the present invention provides a cushion body structure which has a proper distance of open space without joining at least a part of the end portions along the planar fastening body to the cushion material positioned in proximity to it, so that the planar material follows the skin material and is not separated by an external force such as a tensile force or the like which acts on the surface material when getting on and off the car seat.

Specifically, the planar fastening material is fixed into the cushion material in a form of the planar fastening body integrated with a support material such as slab urethane foam. Thickness of the slab urethane is not specified in a certain range but it may be 5 to 15 mm, preferably 10 mm. While such a planar fastening body is attached to preferably the whole of a seating surface of a cushion material or at least a main part of the cushion material, in the present invention a side end and preferably a lower back side of the planar fastening body is spaced a proper distance from sides and a center of the cushion material. The proper distance is found to be about 5 mm to about 20 mm. Therefore, if the cushion body structure of the present invention is cut away over an area including the planar fastening body, a linear shaped spacing or an L-shaped spacing from the side end to the lower side is formed between the side end of the planar fastening body and the cushion material. Thus, the side end of the planar fastening body can follow an external force to extend or freely move, and even though the skin attached on its upper surface is tensioned by a tension force F1 (FIG. 4) it is facilitated to behave by following it and a force component F2 is not produced, and thereby noise or vibration produced in the art by moving a user's body is not produced because a separation between the skin material and the planar fastening material is not generated and they are not attached again.

BEST MODE FOR CARRYING OUT THE INVENTION

Figure 1:
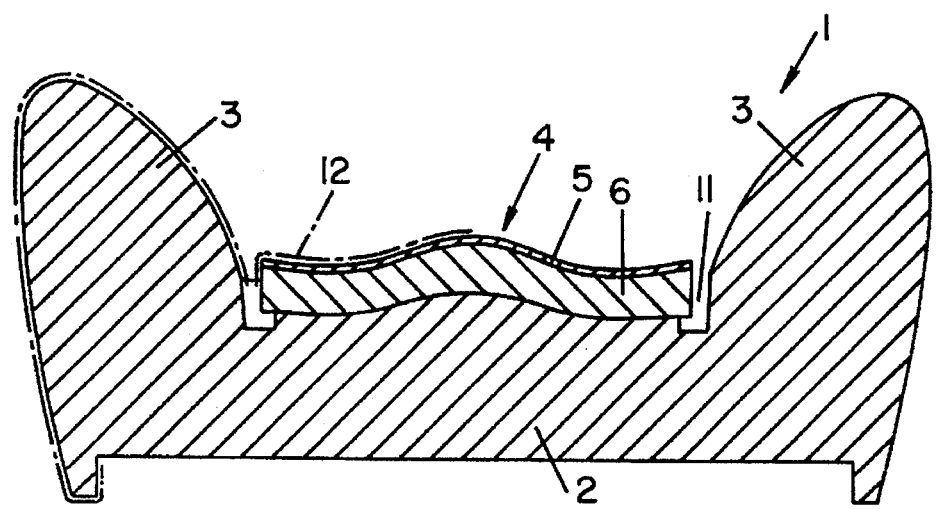
FIG. 1 is a lateral cross-sectional view showing a section of a cushion structure available for preventing noise in accordance with the present invention.

An embodiment of the present invention is described referring to the drawings. FIG. 1 is a view of a cross section cut in a lateral direction of a cushion body of a car seat providing the noise preventing structure of the present invention. The cushion body 1 consists of a cushion material such as foamed urethane and a planar fastening body 4 coupled to it. The cushion body 1 consists of a main portion 2 forming a seat and side portions 3, 3 rising on its right and left hand sides. The planar fastening body 4 is preferably connected on the body portion 2 by integrally molding. The planar fastening body 4 consists of a structure of laminated and molded planar fastening material 5 and a foamed body, as its support material, which is basically of the same characteristics as the cushion material, and preferably a slab of urethane layer 6. An open space 11 as a main feature of the present invention is formed between the planar fastening body 4 and the proximate side portions 3, 3, as shown in FIG. 1.

Figure 3:
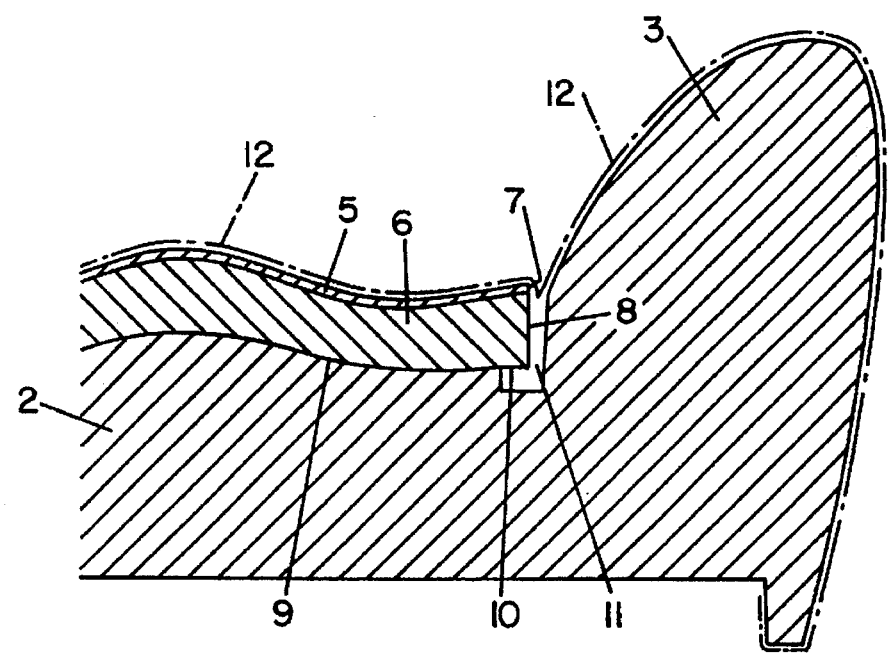
FIG. 3 is an enlarged fragmentary sectional view of a main part of the cushion body structure shown in FIG. 1.

Referring to enlarged FIG. 3, a side end 7 of the planar fastening material 5 and a side end 8 of the slab urethane layer 6 are both spaced from the side 3, to form the open space 11. Moreover, the space 11 is continuously stepped into a lower surface 9 of the slab urethane layer 6 in a reversed L-shape as shown in FIG. 3, so that a lower side end 10 of the slab urethane layer 6 is spaced from the cushion material 2, 3 to freely move. The main part of lower surface 9 of the slab urethane layer 6 is generally connected with body portion 2 of the cushion material.

Figure 4:
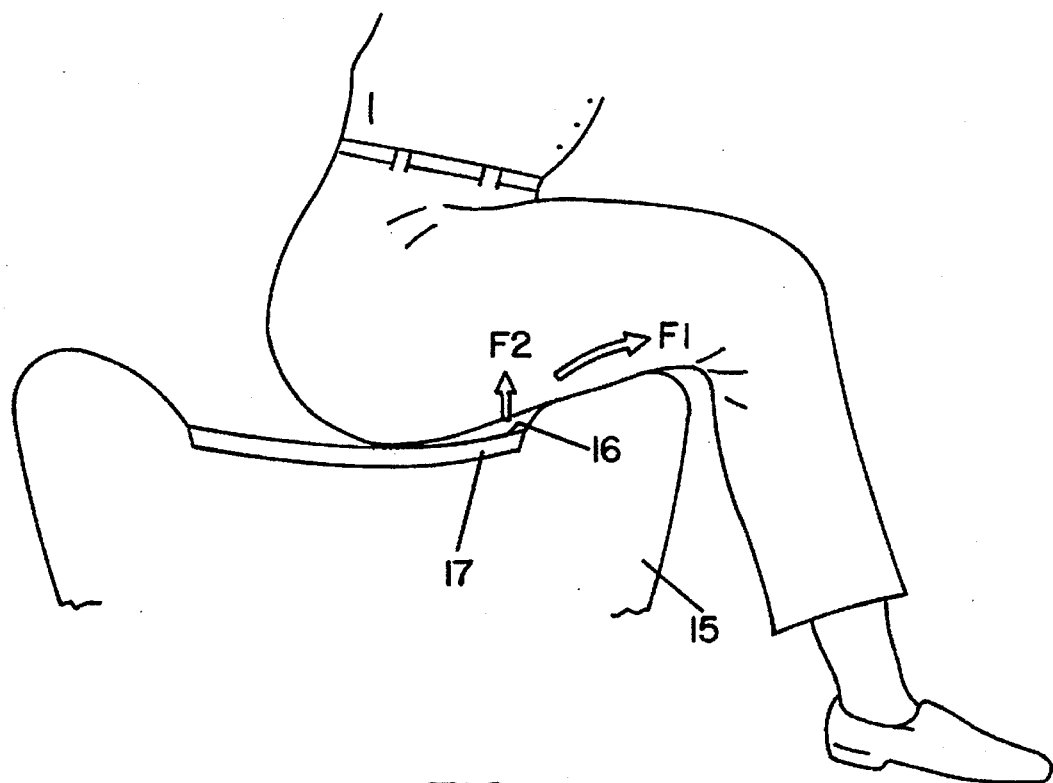
FIG. 4 is a schematic illustration describing how an objectionable noise is produced in a cushion body employing a planar fastener body of the prior art.

The planar fastening material 5 of the planar fastening body 4 has a large number of small protrusions (not shown) provided on the surface, and a skin material 12 as shown by a dotted line is pressed and fixed thereon to be mechanically connected to fastener body 4. It should be noted that the skin material 12 is shown only on the left hand side in FIG. 1 but the skin material similarly covers and is fixed on the right hand side. If an external force F1 described above referring to FIG. 4 acts on the skin material 12, then the skin material 12 rises together with the side end 7 of the planar fastening material 5, and a proximate part of the free side end 8 of the slab urethane layer 6 is naturally raised thereby. As a result, a separation of the skin material 12 is avoided by interlocking the skin material 12 and the planar fastening body 4, and it also avoids fastening again when the tension F1 is released, thereby not producing noise or vibration.

Figure 2:
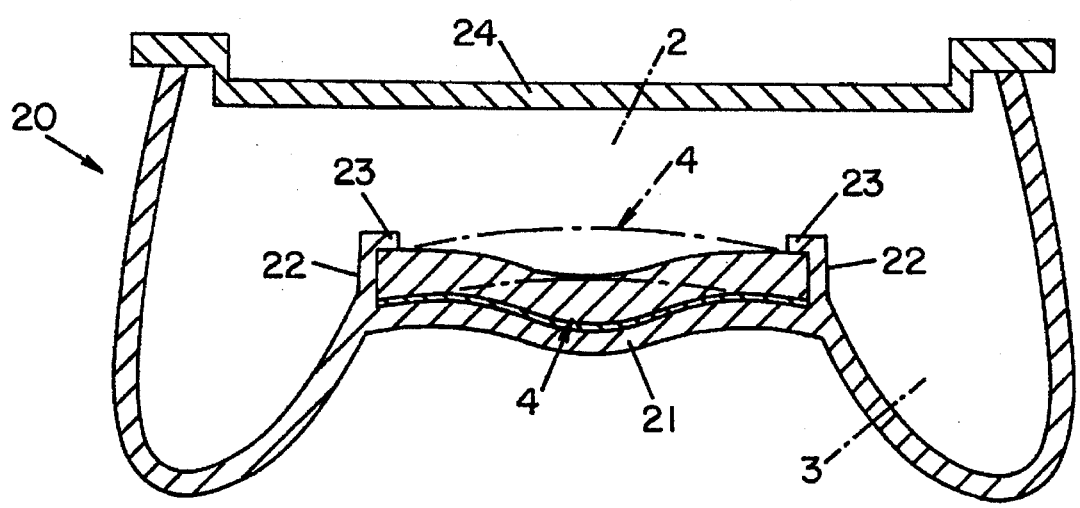
FIG. 2 is a lateral cross-sectional view of a molding die for foaming a cushion body shown in FIG. 1.

A cushion body 1 of the present invention is produced by a molding die as shown in FIG. 2. A lower die 20 of the molding die has a desired three-dimensional curved bottom surface 21 in its central part. In both sides of the bottom surface 21 of the molding die, partitions 22 for forming the open space 11 are provided extending upwardly with hooked portions 23 curved inwardly at their tips. The planar fastening body 4 is installed and clamped under the hooked portions 23 in a state as shown by the dotted lines of FIG. 2. Then, pouring an undiluted solution for the cushion materials downwardly into the lower molding die 20 in accordance with the usual manner and foaming takes place after sealing with an upper die 24. The planar fastening body 4 is pressurized to the bottom surface 21 of the die 20 as shown by the shaded line by the internal pressure of molding and is generally connected with the body portion 2. However, by presence of the partitions 22, 22 and the hooked portions 23, 23, the side ends 7, 8 of the planar fastening body 4 are separated from the cushion body side portions 3, 3 and its lower side 10 is also separated from the side and the body portions so that the side ends 7, 8 being capable of freely moving are formed therein to perform an effective action for preventing noise.

As an embodiment in detail, in order to form a seat profile having a three-dimensional curved surface as shown in FIG. 1, the planar fastening body 4 consists of the planar fastening material 5 (a planar fastener of sold by a company known as KURARE) and slab urethane foam 6 as a support material with a thickness of 5 to 15 mm and a density of 0.018 g/cm³ to 0.040 g/cm³ which is selected by thickness and density available to correspond to a feeling of the seat and the degree of a desired curved surface profile. In practice, the planar fastening body 4, which is laminated-molded of a support material 6 of urethane foam having a thickness of 10 mm and a density of 0.034 g/cm³ and the planar fastening material 5, is employed to form a seat profile having a depth of the curved surface of 10 mm. It is found that a good distance for spacing the cushion material 2, 3 from the planar fastening body is in the range of 5 to 20 mm, according to the size of the bucket seat. In practice, with respect to a bucket seat shape with a size of 85 mm, by setting the outer side spacing distance at 5 mm, it is found possible to embody a high quality seat that does not produce noise and to maintain a seat shape having a good feeling for seating.

AVAILABILITY OF THE INVENTION

As described above, according to the present invention, it is constructed with such effectiveness that noise or vibration is not produced on a planar fastening body 4 by spacing a side end 7, 8 of the planar fastening body 4 connected with a cushion material 6 of a car seat from a cushion material 3 at a predetermined distance. This permits a behavior such as extending or freely moving or the like of the planar fastening material 5 by following a skin material 12 when acted upon by an external force such as a tension force or the like by moving a user's body across the skin material which is mechanically attached to the planar fastening body 4 so that the attachment force is not broken. Thus, it is constructed with such effectiveness as to be easy to adapt a planar fastening body 4, which is considerably more economic and efficient attaching manner comparing with the manner of attaching a skin to a car seat in the prior art, so as to facilitate a reduced cost and to permit adjusting volume of production.

We claim:

1. A cushion structure for a vehicle seat comprising, a cushion body having a main portion and upwardly extending side portions, a fastening body having a support layer of cushioning material integrally formed with said main portion of said cushion body and disposed between said side portions, said fastening body having a planar fastening material carrying fasteners disposed on the surface thereof and being laminated to said support layer, a surface material positioned over said side portions of said cushion body and said fastening body and mechanically attached to said fastening body, an open space provided between said fastening body and said side portions of said cushion body by spacing the side ends of said fastening material and said support layers from said cushion body, thereby precluding separation of said surface material from said fastening body upon the application of external forces to said surface material, and lower side ends of said support layer spaced from said main portion of said cushion body to form a continuation of said open space in the form of a reversed L-shape, thereby permitting free movement of said side ends of said support layer.

2. A cushion structure according to claim 1 wherein said side ends are spaced from said side portions of said cushion body in a range of 5 to 20 mm.

3. A cushion structure according to claim 1 wherein said planar fastening material has a plurality of protrusions for mechanically engaging said surface material.

* * * * *